G. C. BARNEY.
Whiffletree.
No. 13,744.
Patented Nov. 6, 1855.
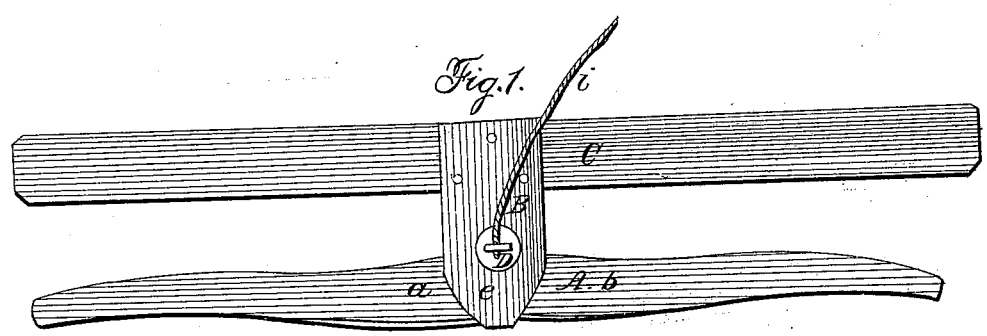
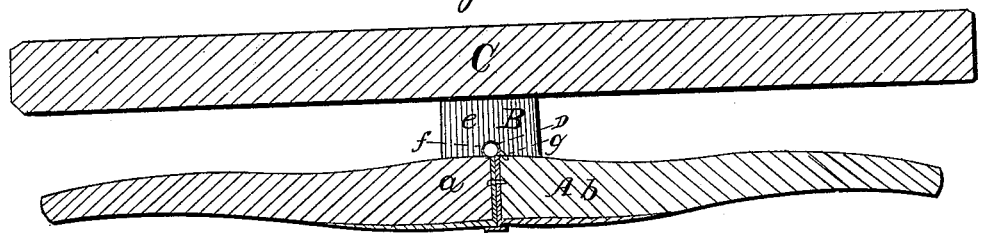
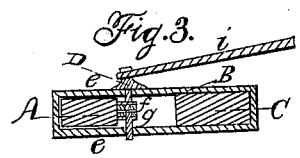
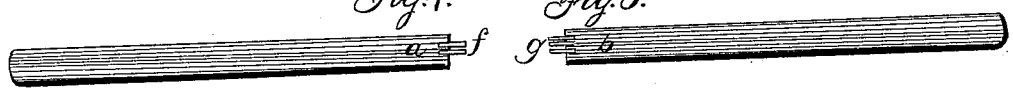

UNITED STATES PATENT OFFICE.

GEO. C. BARNEY, OF BROOKLINE, MASSACHUSETTS.

WHIFFLETREE.

Specification of Letters Patent No. 13,744, dated November 6, 1855.

*To all whom it may concern:*

Be it known that I, GEORGE C. BARNEY, of Brookline, in the county of Norfolk and State of Massachusetts, have invented an improvement in mechanism by which a horse may be suddenly disengaged from a carriage while running away with it or at such other times as may be convenient or necessary to do the same; and I do hereby declare that such is fully described and represented in the following specification and the accompanying drawings, letters, figures, and references thereof.

Of the said drawings Figure 1, denotes a top view of a whiffletree and the back or cross bar of a pair of shafts—the same being provided with my invention. Fig. 2, is a horizontal section and Fig. 3, a vertical central and transverse section of the same. Figs. 4 and 5 are rear side views of two parts of the whiffletree while Figs. 6 and 7 are top views of the same.

In carrying out my invention or improvement, I construct the whiffletree A, in two halves or parts, $a$, $b$, which I joint or hinge together on their rear sides as seen at $c$, and so that when the parts $a$, $b$, are brought into a straight line with each other their inner ends may abut together and preserve the parts $a$, $b$, in such position under the forward draft or strain of the horse, whose harness traces may be attached to or hitched on the outer ends of the whiffletree. The said whiffletree so made is placed between the upper and lower plates $e$, $e$, of a stirrup B, which projects from and is affixed to the middle part of the back or cross bar C, of the thills. A tapering pin D, is passed down through the plates, $e$, $e$, and the two parts $f$, $g$, of the hinge, the whiffletree turning laterally on such pin. From said pin a chain or cord, $i$, may extend upward and over the dasher of the carriage of the whiffletree and within reach of the person who may be driving the horse attached to the carriage.

Provided the breeching of the harness is applied to hold backs so made as to enable it to free itself therefrom by forward draft on it the discharge of a horse from the thills furnished with my improved whiffletree will be an easy matter for by simply pulling the pin D, upward and out of the holes of the plates $e$, $e$, the two parts of the whiffletree will be set free from one another and the thills.

I construct the whiffletree in the above mentioned manner in order that when discharged from the cross bar of the shaft, it may not hang on or injure the hind legs of the horse as it would were it made in one piece, the two parts separating asunder and being dragged on the ground by the animal.

What I claim as my invention or improvement consists therefore, in making a whiffletree in two parts in manner essentially as described and connecting them togther and to the cross bar of the shaft by devices or means substantially as specified whereby results as above explained may be attained.

In testimony whereof I have hereunto set my signature this twenty-eighth day of July A. D. 1855.

GEO. C. BARNEY.

Witnesses:
R. H. EDDY,
F. P. HALE, Jr.